Nov. 5, 1963         M. D. TUPPER         3,109,684
LUBRICATION ARRANGEMENT FOR DYNAMOELECTRIC MACHINES
Filed Sept. 18, 1961
3 Sheets-Sheet 1
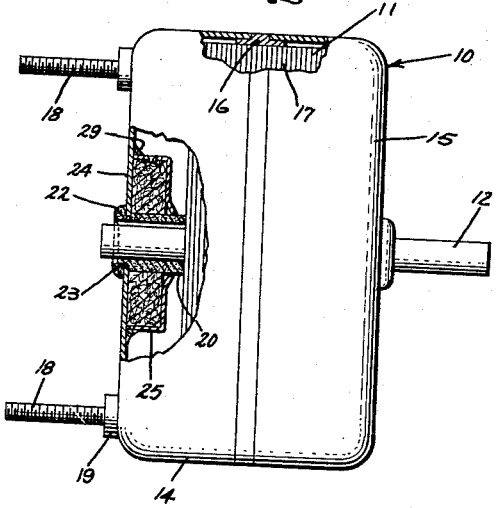
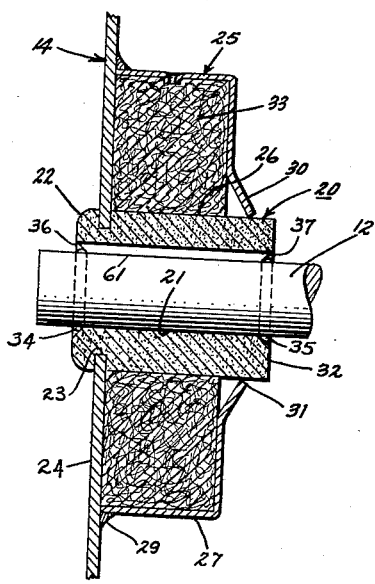
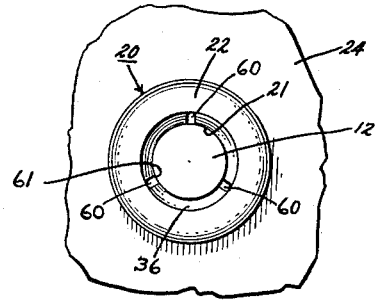
Inventor:
Myron D. Tupper,
by John M. Stoudt
Attorney.

Nov. 5, 1963
M. D. TUPPER
3,109,684
LUBRICATION ARRANGEMENT FOR DYNAMOELECTRIC MACHINES
Filed Sept. 18, 1961
3 Sheets-Sheet 2
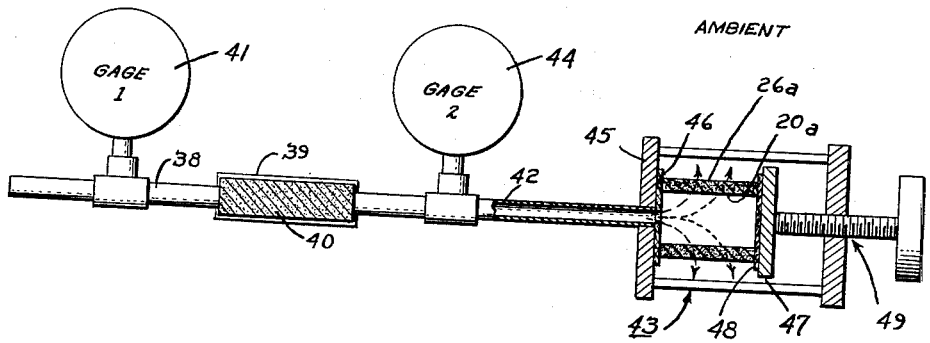
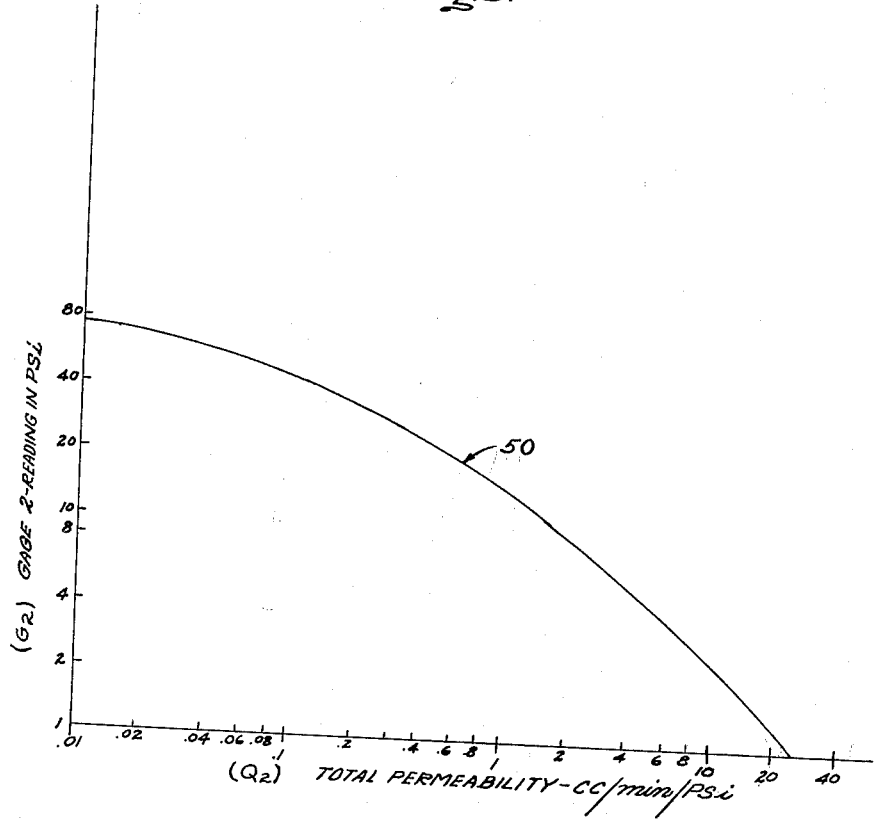
Inventor:
Myron D. Tupper,
by John M. Stoudt
Attorney.

United States Patent Office 3,109,684
Patented Nov. 5, 1963

3,109,684
LUBRICATION ARRANGEMENT FOR DYNAMO-ELECTRIC MACHINES
Myron D. Tupper, Fort Wayne, Ind., assignor to General Electric Company, a corporation of New York
Filed Sept. 18, 1961, Ser. No. 139,002
14 Claims. (Cl. 308—121)

This invention relates in general to bearing structures for rotatably supporting shaft members, and more particularly, to improved means for supplying lubrication to the bearing journaling surfaces in dynamoelectric machines. This application is a continuation-in-part of my co-pending application Serial No. 54,182, filed September 6, 1960 for Lubrication Means For Dynamoelectric Machines, now abandoned.

In small equipment, such as small and fractional horsepower motors, it is extremely desirable to use sleeve type sintered bearings for supporting and journaling rotatable members; e.g. shafts. These bearings are not only inexpensive to manufacture, but are also easily and economically mounted in the equipment. The problem of providing lubrication for the journaling surface of the sleeve type bearings has generally been met by disposing in the vicinity of the bearing, some type of material which will absorb lubricant and act as a reservoir. Lubricant is gradually transferred from this reservoir to the bearing journaling surface during operation of the equipment. Since sleeve type bearings, under certain load conditions, have a tendency to pump lubricant from one end to the other, causing a flooding of the one end, consequently resulting in an excessive loss of lubricant, the lubricant reservoir is usually provided with some means for periodically refilling it with lubricant. This construction, however, permits the lubricant to escape and be thrown from the flooded end of the bearing to the interior part of the motor where it can come into contact with electrical components of the motor; e.g. windings. The lubricant can break down and deteriorate the insulation of these electrical components, ultimately resulting in premature motor failure.

For this reason and for purposes of lubricant conservation, it is common practice, especially in those situations in which it is impractical or sometimes impossible to re-supply the reservoir with additional lubricant; e.g. where the motor is utilized in relatively inaccessible places for long periods of time, to provide a so-called lubricant recirculation system. This system usually includes a lubricant slinger or an oil thrower, attached to the shaft near the bearing, and oil sumps for returning the lubricant, which escapes from the bearing end, back to the lubricant reservoir for reuse. Oil grooves are also cut into the shaft itself to assist in directing the flow of the lubricant. While this approach permits the use of the highly desirable sleeve type bearing, it adds to the over-all complexity and cost of the motor construction. In addition, when lubricant such as oil is continuously reused, it may become carbonized and oxidized to such a degree that proper lubrication of the journaling surface is interfered with, consequently, adversely affecting both the performance and total life of the motor.

Accordingly, it is the general object of the present invention to provide an improved bearing lubrication arrangement, and it is a more specific object of the invention to provide an improved arrangement, employing the highly desirable sleeve type bearing, which eliminates the need for recirculating or re-supplying lubricant to the lubricant reservoir, yet provides proper lubrication of the bearing journaling surfaces over an extended period of time.

It is a further object of this invention to provide an improved dynamoelectric machine having a bearing lubrication system which requires a minimum of parts and manufacturing expenses to provide controlled lubrication of the bearing journaling surfaces for the life of the machine.

It is another object of the invention to provide an improved bearing construction which has a predetermined total permeability for regulating the rate of flow of lubricant from a reservoir to the bearing journaling surfaces.

It is yet another object of the present invention to provide improved means for equalizing the amount of lubricant at each end of the bearing and for preventing the flooding of one of the bearing ends which would result in an excessive loss of lubricant.

In carrying out the objects in one form thereof, I provide a dynamoelectric machine or motor with at least one sleeve type longitudinally extending sintered bearing secured at one end to the motor housing for rotatably supporting the rotor shaft. A lubricant reservoir for retaining lubricant, such as oil, surrounds the outer longitudinal bearing surface. The bearing is preferably formed of sintered powdered metal material, including no more than two per cent graphite by weight, and has a total permeability per inch of bearing bore diameter of not substantially more than twelve nor substantially less than 0.08 cubic centimeter per minute per pounds of force per square inch (cc./min./p.s.i.) for feeding lubricant at a predetermined rate from the reservoir to the bearing surface which supports the rotor shaft. This construction, among other things, eliminates the need for providing the motor with a lubricant recirculation system.

By another aspect of the present invention, the sleeve type bearing is provided with means for equalizing the amount of free lubricant at each end of the bearing. At least one longitudinally extending groove is formed in the bearing, with an entrance disposed at the periphery of the bearing bore, the radial depth of the groove being at least one and one-third the width of the entrance. With this structure, the equalizing effect is accomplished, unaffected by the direction of rotation of the shaft, and the load carrying ability of the bearing is not appreciably diminished.

The subject matter, which I regard as my invention is particularly pointed out and distinctly claimed in the concluding portion of this specification. My invention, itself, however, both as to its organization and method of operation, together with further objects and advantages thereof, may best be understood by reference to the following description taken in connection with the accompanying drawings.

In the drawings:

FIG. 1 is a side view, partially broken away and partially in cross section of a dynamoelectric machine embodying the improved bearing and lubrication system of the present invention;

FIG. 2 is an enlarged view of a portion of FIG. 1 to show the novel bearing and lubrication system in more detail;

FIG. 3 is an enlarged end view of the sintered bearing illustrated in FIG. 2;

FIG. 4 is a schematic diagram illustrating one method of measuring the total regulated flow through the bearing walls;

FIG. 5 is a graph showing the relationship between the gage reading in p.s.i. of FIG. 4 and total permeability of the bearing;

Figure 7:
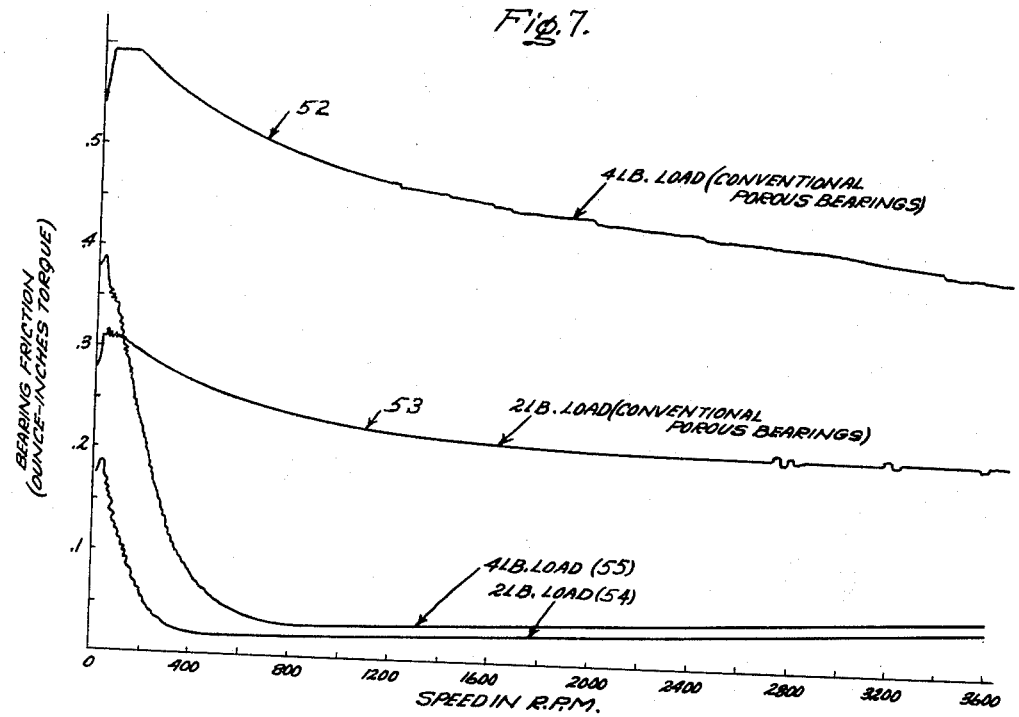
FIG. 7 compares the bearing friction of various motor loads of a motor employing the present invention with the bearing friction of conventional motors.

Referring now to FIG. 1 of the drawings, there is shown a fractional horsepower type electric motor, indicated generally by numeral 10, having a stator 11 of standard construction and a rotor (not shown) suitably secured to a rotatable rotor shaft 12. Stator core 11 is housed within the frame, generally indicated at 13, formed by a pair of end shield assemblies 14 and 15 which may be suitably secured, as by welding or the like shown at 16, to the outer periphery 17 of stator core 11. Means for mounting the motor to a stationary support (not shown) are provided in the form of a plurality of axially extending bolts 18 attached to the end shield assembly 14, as by a bushing and groove arrangement, denoted at 19. The motor described thus far is by way of illustration only and it will be apparent to those familiar with the motor art that the present invention is applicable to other types of construction.

Referring now to the improved bearing lubrication system constructed in accordance with the present invention, and in particular to FIGS. 2 and 3, only one side of the motor has been shown in detail for reasons of simplicity of illustration and description, but it is understood that the other end shield assembly 15 may be constructed in the same manner. In the illustrated form, a longitudinally extending sintered sleeve type bearing 20 (to be described in more detail hereinafter) is provided with an axially extending bore 21 for rotatably supporting each end of the rotor shaft 12. The bearing may be conveniently mounted to the end shield in the manner shown by FIGS. 1 and 2. Bearing end 22, initially having an outer diameter of reduced size, projects through an accommodating opening 23 provided in wall 24 of end shield 14 and the end of the bearing is then staked against the outer surface of wall 24, adjacent opening 23.

Preferably, a lubricant holding reservoir, 25, surrounds and is in direct communication with a substantial portion of the outer longitudinal surface 26 of bearing 20. The reservoir includes a generally cup-shaped member 27, having an outer axial extending cylindrical section fixedly secured to the inner surface 28 of the end shield as by any suitable glue 29, and a radially extending section provided with a conical portion 30 and central opening 31 for accommodating and supporting bearing end 32. Preferably, there is a relatively snug fit between the outer surface of bearing end 32 and conical portion 30 of member 27. Thus, member 27, along with the outer longitudinal surface 26 of bearing 20 and the inner surface 28 of end shield 14, together form a lubricant reservoir cavity which may be substantially filled with suitable lubricant retaining means, such as an oil impregnated felt pad 33.

In studying the problem of providing lubrication for the journal surface of sleeve type bearings, I have found that the proper rate of flow to the journal surface of bearing 20 is characterized by a small bead of lubricant, identified in FIG. 2 by numerals 34 and 35 respectively, which is formed at each end of the bearing during motor operation, when the bearings and shaft 12 are in substantial alignment. As shown by FIGS. 1-3 inclusive, each end of the bearing bore 21 may be countersunk to provide suitable circumferential recesses 36 and 37 for respectively receiving lubricant beads 34 and 35. Under the foregoing conditions, lubricant is lost from the bearing only at its ends by a relatively small amount of lubricant creepage and evaporation which occurs at the lubricant beads. It is highly desirable, if not essential, therefore, that the total rate of lubricant metered to the journal surface of the bearing should approximate the creepage and evaporation loss, otherwise a short bearing life results for a given amount of lubricant, either from an excessive or an inadequate lubrication of the journal surface. To achieve this end, I feed lubricant through the walls of bearing 20 at a rate approximating that of the creepage and evaporation lost from lubricant beads 34, 35 at the respective ends of the bearing.

As used herein, the term "total permeability" refers to the total lubricant metering properties of the bearing, as measured by the total rate of lubricant flow through the bearing walls to bore 21 for a given pressure (e.g., cc./min./p.s.i.). Thus, total permeability is in effect the measure of the total lubricant metered by the bearing to bore 21 for a given period of time, and as such, accounts for differences in the length and radial wall thickness between individual bearings.

During the course of my investigation of the lubrication problem, I also discovered that the rate of lubricant loss from the bearing ends, due to creepage and evaporation, is directly proportional to the bearing bore diameter. Consequently, since the rate of feeding lubrication to a bearing is also a direct function of the bearing bore diameter, the desired range of total permeability for bearings will change proportionately with the bore size of the bearing. For example, a bearing having a bore diameter of 0.50 inch requires a total permeability double that of a bearing having a bore diameter of 0.25 inch. Accordingly, by relating the total permeability to the size of the bearing bore; i.e., total permeability per inch of bearing bore diameter, this variation is taken into consideration.

In the preferred embodiment, bearing 20 (FIGS. 1-3) is composed of a molded, sintered, compressed matrix of powdered material, such as for example a suitable mixture of copper, tin, and not substantially more than two percent (by weight) of graphite. In addition, the bearing is formed with a total permeability, per inch of bearing bore diameter (as determined by capillary passages defining a radial path through the bearing walls to bore 21) of not substantially more than twelve nor substantially less than 0.08 cubic centimeter per minute per pounds force per square inch (cc./min./p.s.i.). With this construction, the bearing feeds lubricant from reservoir 25 to its journal surface at a rate approximating the lubrication creepage and evaporation loss. As will be more fully explained below, the foregoing construction so significantly increases the total useful life of the arrangement per unit volume of required lubricant that the conventional complicated and expensive lubricant recirculation systems can be completely eliminated from equipment utilizing my invention without adversely affecting the bearing lubrication life.

Before explaining further advantages and features of my novel lubrication system, I will describe one possible arrangement for measuring and determining the total permeability of the bearing under standard temperature and pressure conditions. This is schematically illustrated in FIG. 4. The measuring equipment, as shown, includes a tube 38, connected between a suitable supply of gas (not shown), preferably nitrogen, and one end of a cylinder 39, having a suitable reference plug 40; e.g. carbon, the plug being permeable in the axial direction. A standard pressure gage 41 is operatively arranged in series with tube 38, between the gas supply and cylinder 39, to indicate the pressure in tube 38; i.e., the "line" pressure. The other end of cylinder 39 is connected, by tube 42, to a bearing holding assembly 43, with a second gage 44 operatively connected to tube 42 for showing the pressure therein. Assembly 43 comprises a stationary end plate 45 having a seal 46; e.g. rubber disc secured thereto, the end of tube 42 projecting through both plate 45 and seal 46. A second end plate 47, having a seal 48 fastened to it and facing seal 46, is movably mounted in an axial direction, as by screw and stationary frame means, generally indicated at 49. The bearing to be tested, having its body portion substantially free of lubricant and denoted by numeral 20a, is tightly wedged between seals 46 and 48 so that the gas, flowing from the gas supply, through tubes 38 and 42 and plug 40, will be directed radially outwardly from bearing bore 21a, through the bearing body and outer longitudinal surface 26a, to the surrounding atmosphere.

The equipment of FIG. 4 may be conveniently calibrated by the well-known "gas measuring technique," so that the pressure indicated by the second gage 44 may be readily converted to show the "total permeability" for the tested bearing. In actual practice, the calibration was accomplished in the following way. Initially, a standard type needle valve (not shown) was installed in the position occupied by bearing 20a shown in FIG. 4. Then, while maintaining the line pressure at 100 p.s.i., as indicated by the first gage 41, the needle valve setting was repeatedly adjusted and changed to provide a range of flow rates of the gas through the system, from the gas supply to the atmosphere. At each valve setting, the nitrogen gas, escaping from the valve, was captured in an inverted 100 cc. graduate (under water) and the time required to fill the graduate was recorded. In addition, at each valve setting, the pressure between the needle valve and reference plug 40, as registered by the second gage 44, was also tabulated. The table included herinafter sets out for brevity sake a representative number of the time rates and second gage readings, which were taken during the actual calibration of the system. The gage readings appear in column 1, while the corresponding time rates are listed in column 2.

It will be recognized, of course, that both the compressibility of the test gas and the ambient, including moisture vapor pressure and temperature, affect the accuracy of the measured flow rate through the equipment and are factors which must be taken into consideration during the calibration of the system. Accordingly, prior to the calculation of the total permeability for each rate of flow through the system at the individual needle valve settings, the rate of flow of the system at each valve setting must be corrected to account for these factors. This may be illustrated by reference to the following table:

Table

| 1 | 2 | 3* | 4 |
|---|---|---|---|
| Gage 2 reading, "$G_2$" pounds per square inch (p.s.i.) | Rate, "R" in seconds per 100 cubic centimeters (sec./100 cc.) | Flow rate, "$Q_1$" in cc./minute (corrected for ambient conditions and compressibility of gas) | Total permeability "$Q_2$" in cc./minute/p.s.i. $(Q_1)/(G_2)$ |
| 5 | 234 | 21 | 4.20 |
| 10 | 239 | 18 | 1.80 |
| 20 | 285 | 12 | 0.60 |
| 30 | 351 | 8.1 | 0.27 |
| 40 | 470 | 5.2 | 0.13 |
| 50 | 620 | 3.45 | 0.069 |
| 60 | 830 | 2.28 | 0.038 |

Recorded ambient conditions at time of test:
  Barometric pressure, $P_B$=29.2 in. $H_2O$.
  Pressure due to moisture vapor, $P_V$=0.792 in. $H_2O$.
  Temperature=22° C. $T_t$(absolute)=295°.
Standard atmospheric conditions:
  Barometric pressure, $P_s$=29.92.
  Temperature=25° C. $T_s$(absolute)=298°.
*Total ambient correction, A, at time of calibration:

$$A = \frac{P_B - P_V}{P_s} \times \frac{T_s}{T_t}$$

Correction, C, for compressibility of test gas used:

$$C = \frac{14.7 \text{ p.s.i.}}{\frac{G_2}{2} + 14.7 \text{ p.s.i.}}$$

Corrected flow rate:

$$Q_1 = \frac{AC}{R}$$

From the above table, it will be seen that once each rate of flow has been corrected for the compressibility of the test gas and for the ambient (see $Q_1$ in column 3) in the manner shown in the lower portion of the table, total permeability in cc./min./p.s.i. at each rate of flow and gage 2 reading may be determined by dividing the rate of flow $Q_1$ (column 3) by the pressure recorded by the second gage 44 (column 1). By plotting the recorded pressure reading of the second gage against the total permeability (column 4) for that particular gage reading, a calibration curve 50 is obtained as shown in FIG. 5. This curve may then be consulted to convert the second gage reading directly into total permeability of the tested bearing during the actual test of permeable bearings. This will be explained more fully hereinafter.

Once the system has been calibrated in the above fashion, the needle valve is unfastened and removed from plate 45 and the bearing to be tested is then positioned in holding assembly 43, as illustrated in FIG. 4, with seals 46 and 48 in tight engagement with the ends of the bearing. The total permeability of the bearing is measured by maintaining the line pressure (tube 38), between the gas supply and reference plug 40, at 100 p.s.i., and recording the pressure registered by the second gage 44. This pressure is readily converted to total permeability for that particular test bearing by reference to the calibration curve 50 of FIG. 5. For convenience and ease of reading, calibration curve 50 is plotted on a log-log chart. Whenever a new or different permeable reference plug is employed in the test equipment, the system must be re-calibrated for that plug, the re-calibration being accomplished as explained above. Regardless of the permeability of the reference plug used, it will be found that after the test system has been calibrated for the particular plug utilized and the second pressure gage reading-total permeability curve has been obtained, whether tested with the old or new permeable reference plugs, the tested bearing will have the same total permeability.

It will be remembered that total permeability is the measure of the total lubricant delivered to the bearing bore 21 for a given period of time. In order to relate the total permeability obtained from curve 50 of FIG. 5 to the size of the bearing bore, thereby accounting for the effect of the bore size on the amount of lubricant loss from the lubricant beads 34 and 35, the total permeability value taken from curve 50 must be divided by the bore diameter of the bearing involved, resulting in total permeability per inch of bearing bore diameter.

The significance and true import of the novel lubrication system of the present invention is clearly illustrated by reference to curve 51 of FIG. 6 which shows the relationship between total permeability per inch of bearing bore diameter and the life of the bearings, as expressed in hours of life for a given unit of lubricant used. Curve 51 shows that the typical range of total permeability per inch of bearing bore diameter for conventional porous type bearings, mounted in motors having no lubricant re-circulation systems, is between 400–700 cc./min./p.s.i. It was found that these conventional porous sleeve type bearings were capable of 3000 hours of operation before failing for each cubic centimeter of lubricant supplied to the bearing journal surfaces. However, when motors, under the same operating conditions, were provided with the lubrication system of the present invention (the bearings having the afore-defined range of total permeability, per inch of bearing bore diameter), the life of the bearings for each cubic centimeter of lubricant used was up to and in excess of 55,000 hours. These test motors included bearings having bore diameters of 0.0125″, 0.025″, and 0.50″, among others.

It was found that even though the lubricant employed in the tested motors was varied over the range of viscosity normally used in small motors (i.e., 50 to 400 Saybolt seconds), only the total permeability per bearing bore diameter of the bearings generally within the range of 0.08 to 12 cc./min./p.s.i. gave the unusually long bearing lubrication life as represented by curve 51. Moreover, the tests included a deliberate misapplication of operating conditions, that is the normal limits of the operating temperatures adjacent the lubricant reservoir and bearings were extended to a low of −30° C. and a high of +50° C. for test purposes. For the lower operating temperature runs, lubricant in the lower part of the viscosity range was employed. Lubricant having viscosity in the upper end of the range was utilized for the higher temperature test conditions. Even under these extremely adverse conditions, the results represented in FIG. 6, with respect to the greatly extended lubrication life for a given quantity of lubricant and the ensuing long service of motors including my invention, were not altered. One possible explanation for the foregoing is the inverse relation both of the lubricant flow through a capillary path (such as that in bearing 20) and of the lubricant loss at beads 34, 35 with respect to the lubricant viscosity, which in turn is affected by the operating temperature. Further, it will be recalled that I feed lubricant by capillary action through bearing 20 at a rate similar to that of the creepage and evaporation loss from the bearing ends. Thus, in theory, under normal operating conditions for a motor, satisfactory performance would be entirely dictated by the total permeability (rate of capillary flow) per bearing bore diameter and would not be dependent upon viscosity, temperature or variations in bearing size.

Figure 6:
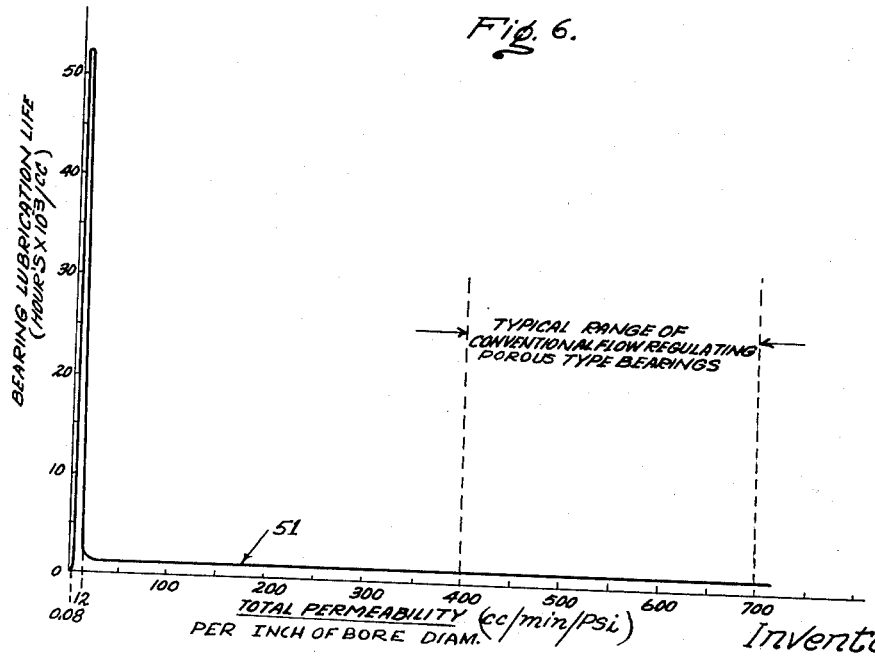
FIG. 6 is a graph showing the effect of total permeability of sleeve type bearings with respect to bearing life for motors having no lubricant recirculation systems.

Referring now to FIG. 7, the bearing friction, an indication of wear and bearing life, of motors having bearings with the total permeability per inch of bore diameter in accordance with the present invention, is compared with the bearing friction of motors having conventional porous bearings within the total permeability per inch of bore diameter illustrated in FIG. 6 and mentioned above; i.e., 400–700 cc./min./p.s.i. Generally speaking, prior to the present invention, as the applied shaft load is increased for any given bearing, there is a corresponding proportional increase in the bearing friction. However, with the present invention, an increase in shaft load merely increases the bearing friction by a nominal amount. This is clearly illustrated, for example, from an examination of curves 52 and 53 which are typical bearing friction-speed curves for motors employing conventional porous sleeve type bearings having 0.25 inch diameter bores under two and four pound shaft load conditions, respectively. The motors under consideration utilized no lubricant re-circulation system. For the two pound load (curve 52) it will be seen that once the motor was started and the shaft rotated at a speed of 2000 r.p.m., the bearing friction was approximately 0.22 ounce-inch of torque. When the load was doubled, to four pounds, the bearing friction of the same motor also approximately doubled in value.

Comparing a typical motor embodying the present invention under the same bearing bore size and load conditions, curves 54 and 55 respectively represent two and four pound loads. At a shaft speed of 2000 r.p.m., curve 54 shows that the bearing friction was about 0.04 ounce-inch of torque, only 18.2% of the bearing friction for the comparable conventional motor, and an increase of load to four pounds (curve 55) merely increased the bearing friction torque from 0.04 to 0.05 ounce-inch. Thus, it will be appreciated that motors embodying the lubrication arrangement of the present invention will not only have a far lower bearing friction than was heretofore possible for a given bearing bore size, but in addition, the load applied to the motor shaft will not appreciably affect the bearing friction, enhancing both the performance and life expectancy of the motor.

With reference to the manner in which the bearing of the preferred embodiment may be produced, a number of satisfactory sleeve type bearings, with bores of various diameters (e.g., 0.25 inch) and with the requisite total permeability, have been manufactured by the following powdered metallurgy process. Briefly stated, a mixture of metallic powder, substantially free of impurities and consisting of (by weight) 90 parts copper, ten parts tin, and 1.5 parts graphite, was initially placed into a mold cavity, having the desired bearing configuration, of a conventional powdered metal molding press where the material was pressed or compacted into a semi-finished or so-called "green" powdered bearing at a pressure in the neighborhood of five tons per square inch. This semi-finished compacted bearing was then placed into a standard sintering oven and sintered or "fired" at a temperature of approximately 1450° F. for about twelve minutes whereupon the fired material became a unitary substantially rigid body.

After the sintering step, the fired bearing was inserted into a second mold cavity, having suitable configured walls and a central pin for properly sizing the bearing bore, and was compacted a second time. During this compacting operation, the fired bearing was subjected to a pressure of approximately thirty tons per square inch. When the bearing was removed from the mold cavity, the central pin burnished the bore of the bearing into a finished, smooth journaling surface. At this point in the process, the total permeability of the bearing may conveniently be checked or measured in accordance with the test procedure previously outlined. Finally, the bearing was immersed in suitable lubricant and impregnated with a small quantity of lubricant, sufficient to establish an initial capillary path of lubricant through the bearing, from its outer surface 26 to its journal bore 21.

In the finished permeable molded sintered sleeve type bearing produced by the procedure just described, the graphite fills the bearing pores and along with the compacting procedure provides the controlled flow of lubricant therethrough by capillary action. As mentioned previously, the graphite content in the bearing of the preferred embodiment preferably should not exceed two percent by weight of the total sintered mixture in the permeable portion of the bearing. Based upon actual motor tests, graphite in amounts greater than two percent by weight may be carried out of the sintered surface by the lubricant and tends to accumulate in the clearance between the surface of bearing bore 21 and the outer periphery of shaft 12. In time, this build up may cause high and erratic friction forces and adversely affect the operating life of the motor by clogging the aforementioned clearance.

To the best of my knowledge, it is not possible to provide the requisite predetermined total permeability or regulation of interconnecting pore sizes of the metallic sintered bearing of the preferred embodiment in the essential range by control of the compacting pressures alone during the formation of the bearing. For example, although the compacting steps outlined above do tend to regulate the size of the capillary passages radially through the bearing, as a practical matter there is an upper limit of compacting pressure that may be satisfactorily employed. This upper limit will depend to some extent on the ductility of the bearing material; however, I have found that a compacting pressure after sintering above thirty-five tons per square inch usually fractures the bearing. Consequently, graphite or its equivalent is incorporated in the bearing matrix to act as a filler in the capillary passages for achieving the predetermined rate of flow characteristics of the bearing. I prefer to employ graphite as the filler since it functions as a dry lubricant on the bearing forming dies, thereby extending the useful life of the dies, and tends to reduce the shrinkage of the semi-finished bearing as it is being sintered.

By another aspect of the present invention, I provide a unique means for equalizing the free lubricant disposed at the respective ends of the bearing in the form of the lubricant beads 34 and 35 mentioned heretofore, thereby insuring a minimum of lubricant losses from the bearing ends, even under extreme conditions of shaft load and/or bearing-shaft misalignment. As is well known to those skilled in the art, under either or both of these extreme conditions, where sleeve type bearings are employed, there is a tendency for the shaft as it rotates to pump lubricant from one end of the bearing to the other, flooding the one end with lubricant while starving the other end. This results in not only an improper and uneven lubrication of the entire journal surface, but also the excessive use of lubricant. The axial direction of flow, due to this pumping action, is dependent upon the direction of shaft rotation. Thus, lubricant will be continuously pumped toward the flooded end, where the excess will be thrown radially away from the shaft. If the end of the bearing, which faces the interior of the motor, becomes flooded in this manner, the lubricant would be thrown from the bearing into contact with the electrical components of the motor, adversely affecting those components.

In order to equalize the beads of lubricant contained at each end of the bearing during operation of motor 10, as shown in FIGS. 1–3 inclusive of the drawings, I form at least one relatively deep groove 60 in bearing 20, having its entrance 61 arranged at and in communication with the periphery of bearing bore 21. These grooves may be conveniently provided in the bore 21 during the first compacting step by forming the die cavity with projections corresponding to the grooves. In the illustrated embodiment, three angularly spaced apart grooves are shown, each extending axialy across the bearing between and communicating with recesses 36 and 37, located at the respective ends of bearing bore 21. The radial depth of each groove is dimensionally greater than the width of groove entrance 61, preferably by one and one-third or more. In actual practice, I have found that the practical upper limit of the entrance width of the groove is in the neighborhood of 0.060 inch, even for larger size bearing bores; i.e., two inches or above. With this construction, the grooves function similar to capillary passages and tend to balance the amount of free lubricant between beads 34 and 35, disposed at the respective bearing ends. Consequently, the direction of transfer of lubricant through the grooves is dictated entirely by the lubrication requirements at the bearing ends and is unaffected by the direction of rotation of the shaft. In addition, even with the use of several grooves in a bearing having a bore size under one-half inch, the load carrying characteristics of the bearing are not appreciably affected.

It is recognized, of course, that axial grooves have been provided on the internal bore surface of a bearing prior to the present invention, but these grooves have been generally formed with entrances of greater dimensional width than the radial depth thereof, and function to distribute lubricant along the bore of the bearing to wet the journal surface for purposes of lubrication. In addition, the direction of lubricant transfer by these prior groove arrangements was determined by the direction of the rotation of the shaft, and as such, the grooves were not capable of performing the equalizing function of the present invention. Moreover, in many cases, the relatively wide entrances of such prior groove constructions adversely affected the load carrying qualities of the bearings, especially in the smaller size bearings, since the area available to carry the shaft load is diminished considerably by the groove entrances.

It will be recognized and appreciated from the foregoing disclosure that the present invention provides an inexpensive lubrication arrangement, having relatively few component parts and involving a minimum of manufacturing costs. Further, the use of the highly desirable sleeve type bearing is permitted in the construction of motors, without requiring lubricant slingers, lubricant return paths or any other means for re-supplying or returning lubricant to a lubricant reservoir. In addition, large and impractical lubricant reservoirs for holding lubricant are not necessary since, by the present invention, bearing life is greatly increased for any given amount of lubricant used. Further, the possible effect of bearing-shaft misalignment or shaft load on the total life of the bearing and motor is greatly minimized.

It should be apparent to those skilled in the art, that while I have shown and described what at present is considered to be the preferred embodiment of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. For use in a dynamoelectric machine having lubricant holding means, a sleeve type bearing including a bore with a journal surface for rotatably supporting a shaft, said bearing having a portion in communication with the bore formed of compressed powder material including not substantially more than 2 percent graphite by weight and having a total permeability, per inch of bearing bore diameter, not substantially in excess of 12 cc./min./p.s.i. for feeding lubricant at a predetermined rate from the lubricant holding means to said bore whereby both the friction between the bearing journal surface and the shaft is reduced and the bearing operating life for a given quantity of lubricant is extended over bearings having a portion formed of compressed powder material exceeding said 12 cc./min./p.s.i. total permeability per inch of bearing bore diameter.

2. For use in a dynamoelectric machine having at least one lubrication reservoir, at least one sleeve type bearing mounted in the machine and formed with a bore defining an inner journaling surface for rotatably supporting a shaft, said bearing having a body portion of compressed powder material forming at least a part of said journaling surface, said bearing body portion formed with interconnecting pores and including not substantially in excess of 2 percent graphite by weight of said powder material to provide a total permeability, per inch of bearing bore diameter, in the range from 0.08 to 12 cc./min./p.s.i. for feeding lubricant at a predetermined rate by capillary action from the reservoir to said bore whereby both the friction between the bearing journal surface and the shaft is reduced and the bearing operating life for a given quantity of lubricant is extended over bearings having a total permeability per inch of bearing bore diameter beyond said range.

3. In a machine having a housing, at least one sleeve type bearing mounted in said housing and formed with an outer surface and a bore defining an inner journaling surface, a shaft rotatably supported by said inner journaling surface, a lubricant reservoir surrounding said outer bearing surface, said bearing comprising a lubricant flow-regulating body portion of sintered powdered material, including not substantially more than 2 percent graphite by weight, extending between said inner and outer surfaces and having a total permeability, per inch of bearing bore diameter, in the range of 0.08 to 12 cc./min./p.s.i. for feeding lubricant at a predetermined rate from said reservoir through said body portion to said inner bearing journaling surface whereby both the friction between the bearing journal surface and the shaft is reduced and the bearing operating life for a given quantity of lubricant is extended over bearings having a total permeability per inch of bearing bore diameter beyond said range.

4. In a machine having a housing, at least one sleeve type bearing mounted in said housing and formed with an outer surface and a bore defining an inner journaling surface, a shaft rotatably supported by said inner journaling surface, a lubricant reservoir having lubricant retaining means in communication with said outer bearing surface, said bearing comprising a lubricant flow-regulating body of sintered powdered metal material having a total permeability, per inch of bearing bore diameter, in the range of 0.08 to 12 cc./min./p.s.i. for feeding lubricant by capillary action from said reservoir to said inner journaling surface at a predetermined rate approximately equal to the rate at which the lubricant is lost by creepage and evaporation from the ends of said bearing during rotation of said shaft whereby the friction between the bearing journal surface and the shaft is reduced and the bearing operating life for a given quantity of lubricant is extended over bearings having a total permeability per inch of bearing bore diameter beyond said range.

5. In a machine having a housing, at least one sleeve type bearing mounted in said housing and formed with a bore defining an inner journaling surface, said bearing having a body portion of sintered powder material forming at least a part of said journaling surface, a shaft rotatably supported by said inner journaling surface, lubricant holding means in communication with said body portion, said body portion having a total permeability, per inch of bearing bore diameter, not substantially more than 12 nor substantially less than 0.08 cc./min./p.s.i. for feeding lubricant at a predetermined rate from said lubricant holding means to said inner bearing journaling surface, at least one groove formed in said bearing with an axially extending entrance thereto disposed along said journaling surface for equalizing the amount of lubricant contained in a bead formed at each end of the bearing during rotation of said shaft, the radial depth of said groove being dimensionally greater than said groove entrance.

6. In a dynamoelectric machine having a housing, at least one sleeve type bearing mounted in said housing and formed with a bore defining an inner journaling surface and an outer surface, a shaft rotatably supported by said inner journaling surface, a lubricant reservoir in communication with said outer surface, said bearing formed of sintered powder material having interconnecting pores and including a filler not substantially in excess of 2 percent by weight thereof to provide a total permeability per inch of bearing bore diameter, not substantially more than 12 nor substantially less than 0.08 cc./min./p.s.i. for feeding lubricant by capillary action at a predetermined rate from said reservoir to said inner bearing journaling surface, at least one groove communicating between the ends of said bearing with an axially extending entrance thereto disposed at the periphery of said journaling surface for equalizing the amount of lubricant contained in a bead at each bearing end, the radial depth of said groove being at least one and one-third the dimensional width of said groove entrance.

7. In a dynamoelectric machine, a rotatable member, means for supplying lubricant to the journaled surface of said rotatable member, a sleeve type bearing having an axially extending bore for rotatably supporting said journaled surface, at least one groove formed in said bearing with an entrance extending along said bore, the width of said entrance being no more than 0.06 inch and dimensionally less than the radial depth of said groove whereby said groove transfers lubricant independently of the direction of rotation of said rotatable member.

8. In a dynamoelectric machine, a rotatable member, means for supplying lubricant to the journaled surface of said rotatable member, a sleeve type bearing of sintered powdered material having a bore for rotatably supporting said rotatable member, each end of said bearing formed with a recess for receiving a bead of lubricant, at least one groove extending between and communicating with each recess for equalizing the amount of lubricant contained in each bead, said groove having a radial depth at least one and one-third its dimensional width and being capable of transferring the lubricant between said recesses as dictated by the lubricant requirements at the beads.

9. For use in a dynamoelectric machine, an end shield assembly comprising an end shield member, an axially extending sleeve bearing secured to said end shield member, said bearing having a body portion composed of compressed powdered material including less than 2 percent graphite and formed with an outer surface and an inner bore for rotatably supporting a shaft, lubricant holding means in communication with said body portion, said body portion having a total permeability, per inch of bearing bore diameter, in the range of 0.08 to 12 cc./min./ p.s.i. for feeding lubricant at a predetermined rate from said lubricant holding means through said body portion to said bore whereby the friction between the bearing journal surface and the shaft is reduced and the bearing operating life for a given quantity of lubricant is extended over bearings having a total permeability per inch of bearing bore diameter beyond said range.

10. For use in a dynamoelectric machine, an end shield assembly comprising a generally cup-shaped member, axially extending sleeve bearing secured to said member, said bearing composed of sintered powdered metal material including no more than 2 percent graphite and formed with an outer surface and a bore defining an inner cylindrical journaling surface for rotatably supporting a shaft, said bearing impregnated with lubricant, a lubricant reservoir surrounding said outer bearing surface, lubricant retaining means disposed in said reservoir, said bearing having a total permeability, per inch of bearing bore diameter, within the range of 0.08 to 12 cc./min./p.s.i. for feeding lubricant at a predetermined rate by capillary action from said reservoir through said bearing body portion to said inner journaling surface whereby the friction between the bearing journal surface and the shaft is reduced and the bearing operating life for a given quantity of lubricant is extended over bearings having a total permeability per inch of bearing bore diameter beyond said range.

11. For use in a dynamoelectric machine having lubricant holding means, a sleeve type bearing including a bore with a journal surface for rotatably supporting a shaft, said bearing having a portion formed with interconnecting pores and including filler material not substantially more than 2 percent by weight of the bearing portion composition, said bearing portion having a total permeability, per inch of bearing bore diameter, not substantially in excess of 12 cc./min./p.s.i. for feeding lubricant at a predetermined regulated rate from the lubricant holding means to said bearing bore whereby the friction between the bearing journal surface and the shaft is reduced and the bearing operating life for a given quantity of lubricant is extended over bearings exceeding said 12 cc./min./p.s.i. total permeability per inch of bearing bore diameter.

12. For use in a dynamoelectric machine having lubricant holding means, a sleeve type generally cylindrical bearing including a bore with a journal surface for rotatably supporting a shaft, said bearing formed of a sintered compressed powder composition having interconnecting pores and filler material not substantially more than 2 percent by weight of said composition, said pores and filler material conjointly providing said bearing with a total permeability, per inch of bearing bore diameter, within the range of 0.08 to 12 cc./min./p.s.i. for feeding lubricant by capillary action through said pores at a regulated rate from the lubricant holding means to said bearing bore whereby the friction between the bearing journal surface and the shaft is reduced and the bearing operating life for a given quantity of lubricant is extended over bearings having a total permeability per inch of bearing bore diameter beyond said range.

13. In a dynamoelectric machine, a rotatable shaft, at least one sleeve type bearing having a bore with a journal surface for rotatably supporting said shaft, lubricant holding means, said bearing including a portion having interconnecting pores defining a total permeability, per inch of bearing bore diameter, within the range from 0.08 to 12 cc./min./p.s.i. for feeding lubricant by capillary action through said bearing portion from said lubricant holding means to said bearing bore.

14. In a machine, a rotatable shaft, at least one sleeve type bearing having a bore with a journal surface for rotatably supporting said shaft, lubricant retaining means, said bearing including a sintered portion formed with filler material and interconnecting pores defining a total permeability, per inch of bearing bore diameter, within the range from 0.08 to 12 cc./min./p.s.i. for feeding lubricant through said pores from said lubricant retaining means to the journal surface at a rate approximating that at which lubricant is lost by creepage and evaporation from the ends of said bearing during shaft rotation.

References Cited in the file of this patent

UNITED STATES PATENTS

| | | |
|---|---|---|
| 2,035,519 | Apple | Mar. 31, 1936 |
| 2,153,397 | Sandler | Apr. 4, 1939 |
| 2,223,872 | McWhorter et al. | Dec. 3, 1940 |
| 2,232,788 | Kitto | Feb. 25, 1941 |
| 2,233,104 | Martinet | Feb. 25, 1941 |
| 2,300,118 | Hensel et al. | Oct. 27, 1942 |
| 2,571,868 | Haller | Oct. 16, 1951 |
| 2,855,249 | Gerard | Oct. 7, 1958 |
| 2,948,355 | Hull | Aug. 9, 1960 |
| 3,013,847 | Gits | Dec. 19, 1961 |

FOREIGN PATENTS

| | | |
|---|---|---|
| 750,060 | Great Britain | June 6, 1956 |

OTHER REFERENCES

Product Engineering, August 1944, pages 561–564.
Scientific American, February 1939, pages 80–82.